March 6, 1951 — G. H. KELLER — 2,544,502
STICK CANDY MACHINE
Filed May 27, 1949 — 2 Sheets-Sheet 1
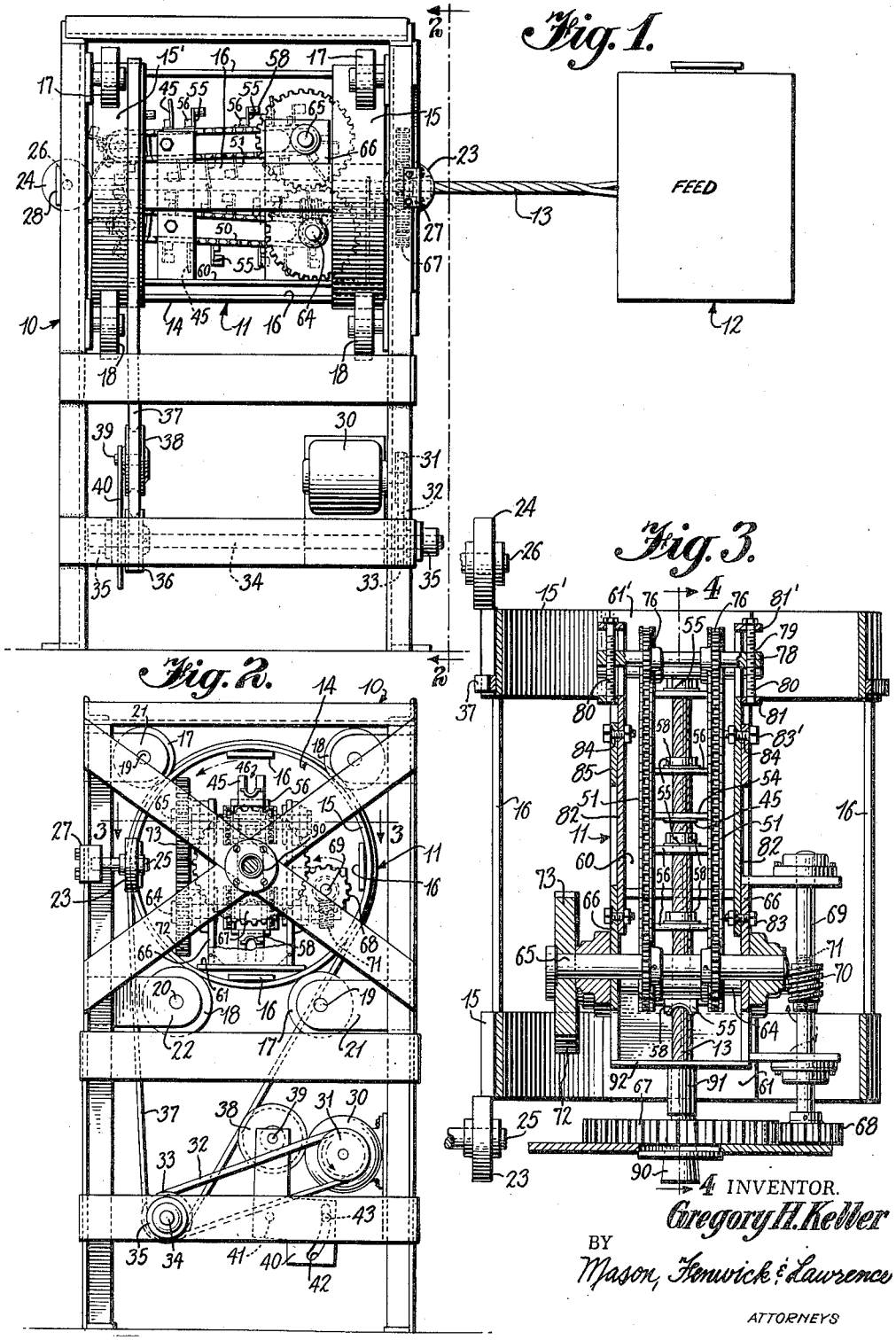
INVENTOR.
Gregory H. Keller
BY Mason, Fenwick & Lawrence
ATTORNEYS

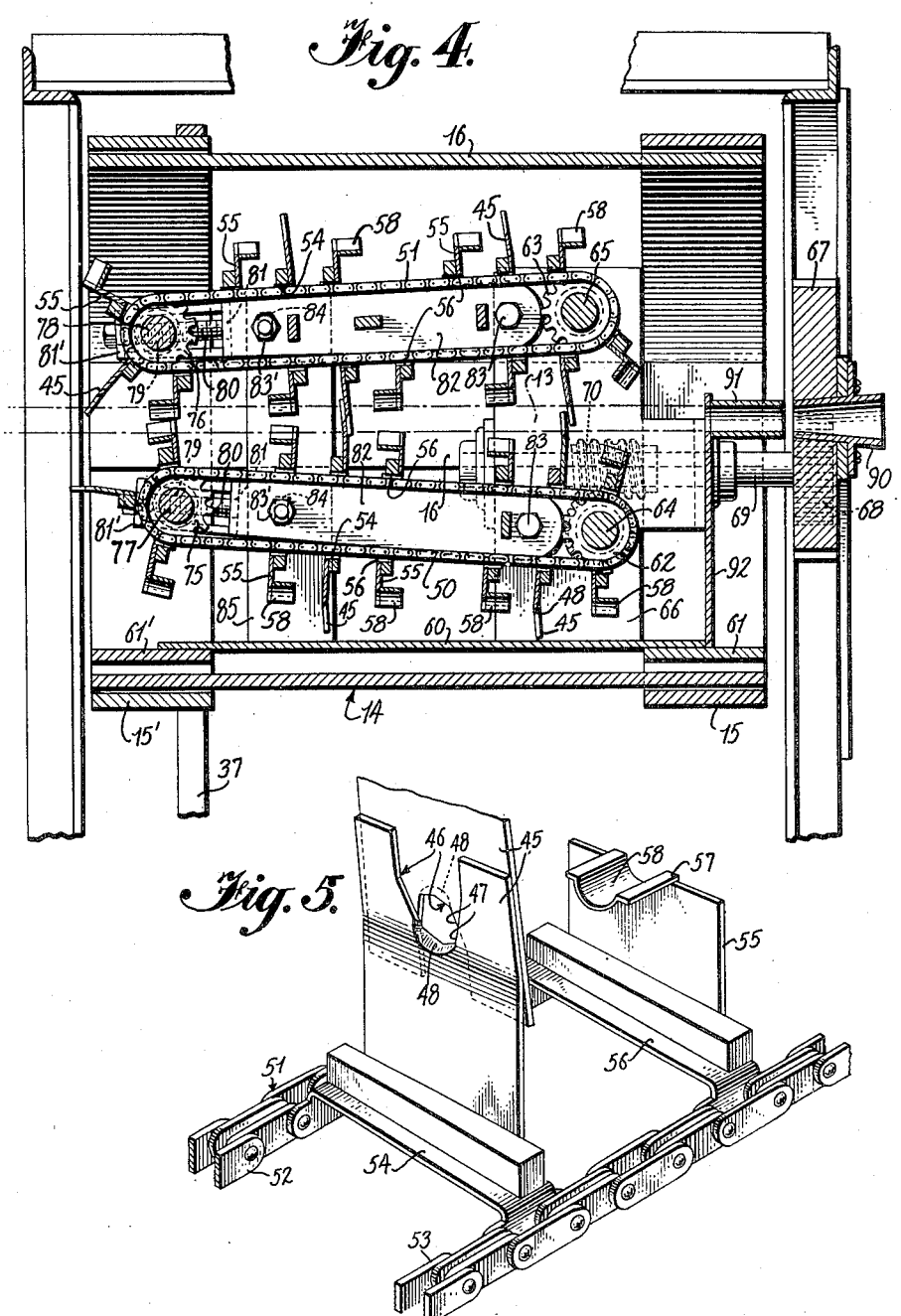

Patented Mar. 6, 1951

2,544,502

UNITED STATES PATENT OFFICE 2,544,502

STICK-CANDY MACHINE

Gregory Harding Keller, Helena, Ark., assignor of one-half to Robert E. McCormack, Albany, Ga.

Application May 27, 1949, Serial No. 95,745

11 Claims. (Cl. 107—8)

1

The present invention relates to candy making machines, and more particularly to apparatus for receiving stick candy after it has been formed into an elongated cylindrical strip having a longitudinally disposed colored stripe or stripes on the surface thereof, and simultaneously twisting the candy strip and severing it into sticks of desired lengths.

Heretofore, candy making machinery has been provided with various types of mechanisms for twisting a cylindrical strip of stick candy into a uniform spiral and severing the twisted strip into desired lengths for wrapping and shipping. These machines were designed to receive the uncut cylindrical strip of candy from a hopper and a series of feeding and reducing rollers. The strip of candy fed from the reducing rollers is an elongated cylindrical strip having a longitudinally extending colored stripe or a plurality of such stripes along the surface thereof.

In such prior art candy making machines, the severing devices often interfere with a steady and even flow of the uncut strip of candy from the reducing rollers at the instant the severing devices make contact with the candy strip. Due to such interference, the uncut strip may be caused to back up within the candy making machine and clog the other apparatus of the machine. In many cases, if the severing devices do not interfere with a steady even forward movement of the uncut strip, they may interfere with the steady twisting movement thereof and to some extent cause untwisting of the strip at the instant the severing devices make contact therewith. The instant device obviates these difficulties by feeding and twisting the cylindrical strip of uncut candy fed from the reducing rollers, and at the same time cutting or severing the same into desired lengths during its travel and its twisting movement without interrupting either movement.

It is an object of the present invention to provide a novel stick candy making machine capable of twisting an uncut strip of candy so as to form a helical stripe or stripes thereon, and at the same time sever such candy into sticks of desired length.

Another object of the present invention is the provision of a novel stick candy making machine wherein gripping elements are provided for the uncut candy strip to impart uniform twisting movement thereto and progressively cut through the candy strip at the point of contact so as to feed the candy strip continuously through the machinery and sever the same near an outlet provided in the machine.

2

Another object of the present invention is the provision of a novel stick candy making machine adapted to twist an uncut strip of candy fed thereto so as to form a uniform helical stripe or stripes thereon and sever such candy into sticks, in a single operation, wherein the feeding, twisting and severing mechanism are continuously rotated as a unit about the feed axis of the candy strip.

Another object of the present invention is the provision of a novel stick candy making machine wherein a series of pairs of contact elements rotatable about the candy strip are provided having associated gripping and shearing surfaces thereon adapted to be brought into progressively overlapping relation about the candy strip to successively impart a helical twist to said strip and sever the same during convergent movement of the contact elements.

Another object of the present invention is the provision of a novel stick candy making machine of the type referred to which will be of convenient, simple and durable construction, and will be uniform and dependable in operation.

Other objects, advantages and capabilities of the present invention will become apparent in the following detailed description, taken in conjunction with the accompanying drawing in which only a preferred embodiment of the invention is shown.

In the drawing:

Figure 1 is a side elevation of a stick candy making machine embodying the present invention, wherein the hopper and feeding and reducing mechanism for producing the continuous uncut cylindrical candy strip to be fed to the twisting and cutting machine is indicated schematically;

Figure 2 is an elevation of the input end of the stick candy twisting and severing machine taken from the position indicated by the lines 2—2 of Figure 1;

Figure 3 is a horizontal longitudinal section view of the stick candy twisting, feeding and severing mechanism of the machine taken along the lines 3—3 of Figure 2;

Figure 4 is a vertical longitudinal section view of the portion of the machine shown in Figure 3, taken along the lines 4—4 of Figure 3; and Figure 5 is a perspective view of a portion of the feed sprocket chain and gripping plates forming the feeding and severing means in the subject machine.

Referring to the accompanying drawings wherein like reference characters designate corresponding parts throughout the several figures, and more particularly to Figures 1 and 2, a mechanism for imparting a uniform twist to a strip of uncut stick candy to form a uniform helical stripe about the surface thereof and to sever the uncut strip into sticks of uniform preselected lengths, embodying the present invention, is contained within a main supporting frame generally indicated at 10. The main supporting frame 10 comprises a network of vertical and horizontal structural bracing elements positioned to support the various components of the combined twisting and cutting assembly, generally indicated at 11.

The combined twisting and cutting assembly 11 is designed to receive a cylindrical, elongated strip of uncut candy consisting of a main candy strip with a distinctive colored strip longitudinally combined therewith to subsequently form the helical stripe, and is produced in conventional manner well known in the art from a hopper for a batch of the candy, schematically indicated at 12, which may include conventional feeding and reducing rollers employed to produce at the outlet thereof a continuous cylindrical strip of candy 13 of desired diameter.

The uncut strip of candy 13 is coupled from the hopper and reduction roller assembly 12 directly to the combined twisting and cutting assembly 11, supported on the main supporting frame 10 and disposed within a horizontally oriented cylindrical housing drum 14, mounted for rotation about a horizontal axis. The drum 14 housing the twisting and cutting assembly, comprises a pair of tubular rims 15, 15' spaced from each other defining the forward and rearward ends of the assembly housing drum 14, respectively (viewed from the hopper assembly 12). Between the spaced tubular rims 15, 15' are a plurality of slat or lath members 16 forming coupling braces for the housing drum 14.

The housing drum 14 is supported for rotation about a horizontal axis on a plurality of upper and lower idler rollers 17 and 18, respectively. The rollers 17 and 18 are of conventional construction and are journaled for rotation about shafts 19 and 20 mounted on supporting brackets 21 and 22 extending laterally from and secured to upright structural members of the main supporting frame 10. Idler rollers 23 and 24 are likewise provided to engage the forwardly and rearwardly disposed surfaces of the tubular rim members 15 and 15' to position the drum relative to the horizontal axis through the main supporting frame 10, and for this purpose are journaled for free rotation about shafts 25 and 26, respectively, secured to the main frame by means of brackets 27 and 28.

To impart continuous rotation to the housing drum 14, an electric motor 30 of any of the conventional commercially available types, is provided on the main supporting frame 10. The electric motor 30 may be mounted on the main supporting frame 10 on a fixed or adjustable support. To impart continuous rotation in a counter-clockwise direction (viewed from Figure 2) to the housing drum 14, a pulley 31 is mounted on the shaft of the electric motor 30 and is coupled by means of belt 32 to a pulley 33 mounted on a master drive shaft 34 extending longitudinally across the main supporting frame 10 on an axis substantially parallel to the central axis of rotation of the housing drum 14. The shaft 34 is disposed at each end thereof in journal boxes 35 mounted on the main frame 10 to permit rotation of the shaft 34 relative thereto.

Likewise positioned on the shaft 34 is a master drive pulley 36 coupled to a belt 37 extending about one of the tubular rims 15, 15' forming the drum housing 14. In this manner, the driving torque produced by the electric motor 30 is coupled to the main housing drum 14 to effect corresponding rotation of the housing drum 14 on the idler rollers 17, 18, 23 and 24.

An adjustable rider pulley 38 is likewise provided to permit preselected tensioning of the belt 37 extending about the housing drum 14. To this end, the tensioning pulley 38 is journaled for rotation about shaft 39 mounted on a right angle bracket 40, which is pivotally mounted, by means of a pin 41, to one of the structural members of the main frame 10. To effect angular adjustment of the tensioning pulley 38 relative to the belt 37, an arcuate slot 42 described about the pivot pin 41 as its center, is provided in the right angle mounting bracket 40, and is adapted to be clamped by a bolt 43 mounted in a structural member of the housing frame 10 and disposed through the slot 42 to permit guiding and clamping of the right angle bracket 40.

The combined twisting and cutting assembly 11 mounted within the housing drum 14 is provided with means to couple the rotation of the housing drum 14 about the central axis of rotation of the drum, corresponding to the feed axis of the uncut strip of candy, to the candy strip to impart a helical twist thereto. To this end, the twisting and cutting assembly 11 is provided with a plurality of contact elements 45 formed of a blade-like structure and having formed in an edge thereof adapted to be disposed adjacent a corresponding edge of another contact element 45, an upwardly opening slot, generally indicated at 46. The slot 46 is formed of a plurality of angularly disposed surfaces arranged in a generally semi-elliptical path. The surfaces or sides 47 of the slot are formed perpendicularly through the contact element 45 to form gripping surfaces adapted to grasp the surfaces of the uncut candy strip fed along the axis of rotation of the drum housing 14. The bottom surfaces 48 of the slot 46 are shaped to form shearing members, and to this end are provided with sharpened edges to effect progressive shearing of the uncut candy strip into desired lengths in a manner to be more fully described.

The contact elements or blades 45 are adapted to be disposed in spaced upright relation on sprocket chains 50 and 51, each comprising a pair of transversely spaced links, indicated at 52 and 53, the contact elements 45 being mounted on cross bars 54 coupled between the links 52 and 53 of the sprocket chains 50 or 51. Spaced in between a successive pair of such contact elements 45 on each of the sprocket chains 50 and 51, are a plurality of supporting elements 55 mounted on cross bars 56 extending between the links 52 and 53 of the sprocket chain in the same manner as the cross bar 54. These are provided, at the upper edge thereof with a flange 57 extending perpendicularly from the blade element 55 and having a semi-cylindrical recess 58 formed along said flange extending substantially parallel to the axis of rotation of the housing drum 14 to support the candy strip during its travel along the axis of rotation of the housing drum 14 after it is severed by the contact elements 45.

The sprocket chains 50 and 51 are adapted to be driven so as to advance the contact elements 45 and supporting members 55 along the axis of rotation of the housing drum 14, constituting the feed axis of the uncut candy strip 13, with the slotted edges of the contact elements 45 being brought into progressively overlapping relation surrounding and gripping the uncut candy strip to impart a helical twist thereto during rotation of the housing drum 14, and progressively effect shearing of the candy strip during convergent movement of the shearing edges 48 of the slot 46. To this end the sprocket chains 50 and 51 are disposed so as to be advanced along converging axes so arranged that the axis bisecting the angle of convergence of the sprocket chains is coincident with the feed axis of the uncut candy strip and the axis of rotation of the housing drum 14. The sprockets for the sprocket chains 50 and 51 are mounted upon a supporting structure disposed on a base plate 60 extending longitudinally between the two tubular rim members 15 and 15' and supported at each end upon transverse supporting plates 61, 61' mounted with the respective rim members. The drive sprockets 62 and 63 for the sprocket chains 50 and 51, respectively, are mounted on transverse shafts 64 and 65, respectively, journaled in cups disposed on an upright mounting bracket 66 fixed to the base plate 60.

The drive for the sprocket chains 50 and 51 is initially coupled to the shaft 64 and sprocket 62. This drive is coupled from a planetary gear system comprising a stationary gear 67 fixedly mounted on structural members of the main supporting frame 10 and disposed concentric with the longitudinal axis of rotation of the housing drum 14. An epicyclic or planetary pinion 68 is mounted on a shaft 69 journaled in supporting brackets extending laterally from the upright supporting bracket 66, and is disposed to engage the toothed periphery of the stationary gear 67 so that epicyclic rotation will be imparted to the planetary pinion 68 as the housing drum 14 in which the pinion 68 is journaled is rotated relative to the main supporting frame 10. A worm 70 is likewise provided on the shaft 69 to which the epicyclic pinion 68 is coupled, disposed to engage a worm gear 71 mounted on the shaft 64, to transfer the driving torque from the pinion 68 to the drive sprocket 62.

This rotary motion transmitted to the shaft 64 for driving the sprocket 62, is likewise coupled to the shaft 65 and sprocket 63 by means of spur gears 72 and 73, mounted on the shafts 64 and 65, respectively. In this manner, the torque derived from the electric motor 30 imparting rotation to the housing drum 14 is translated, by means of the planetary gearing system comprising gears 67 and 68, into a rotary drive for advancing the sprocket chains 50 and 51 along the feed path of the candy strip 13.

A pair of tensioning sprockets 75 and 76 are likewise provided for the chains 50 and 51 disposed adjacent the outlet end of the housing drum 14 and mounted for adjustment so as to be both angularly variable relative to the axis of rotation of the housing drum 14 to adjust the angle of convergence of the sprocket chains 50 and 51, and for spacing adjustment relative to the drive sprockets 62 and 63. The tensioning sprockets 75 and 76 are journaled for rotation about transverse shafts 77 and 78, respectively. Near the lateral end of each of the shafts 77 and 78 are provided threaded apertures, indicated at 79, adapted to receive a threaded bolt 80 therethrough. The threaded bolt 80 is disposed in a pair of flanges 81, 81' disposed at the end of a supporting arm element 82, which is pivotally coupled at one end to the upright supporting bracket 66 at 83, and is provided near the other end thereof with a bolt 83' extending through a slot 84 provided in an upright supporting bracket 85 mounted on the base plate 60 to permit angular adjustment of the shafts 77 and 78 and axes of the sprocket chains 50 and 51 relative to the axis of rotation of the housing drum 14.

With the threaded bolt and aperture arrangement 80 and 79 permitting positioning of the shafts 75 and 76 relative to the sprocket shafts 62 and 63, the desired tensioning of the sprocket chains 50 and 51 may be effected by mere rotation of the threaded bolts 80. Likewise, the position of the shafts 77 and 78 may be altered relative to the axis of rotation of the housing drum 14 by adjustment of the supporting arm 82 vertically about the bolts 83 pivotally coupling the supporting arms 82 to the upright bracket 66, to adjust the convergence of the axes along which the chains 50 and 51 are advanced relative to the axis of rotation of the housing drum 14 to the appropriate rate of overlapping of the slotted edges of the contact element 45 during advance of the elements toward the outlet end of the housing drum 14. This is to permit the rate of convergence to be set to bring the cutting edges 48 of the slots 46 into shearing relation adjacent the outlet end of the housing drum 14.

To facilitate the guiding of the uncut candy strip 13 fed out of the hopper and reduction roller assembly 12 along the central axis of rotation of the housing drum 14, a funnel shaped element 90 is mounted on the main supporting frame 10 concentric with the central axis of the stationary gear 67 of the planetary gearing system and aligned with the axis of rotation of the housing drum 14. A second guide funnel element 91 is mounted on an upright supporting bracket 92 secured to the base plate 60, the funnel 91 being aligned with the central axis of rotation of the housing member 14 to further facilitate guiding of the uncut candy strip until it is engaged by the slots 46 in the adjacent edges of the contact members 45 in the twisting and severing assembly 11.

Operation of the instant machine is as follows. The rotary torque on the output shaft and pulley 31 of the electric motor 30 is coupled through belt 32 and pulley 33 coupled therewith, shaft 34 journaled on the main supporting frame 10 having the pulley 33 and a second pulley 36 mounted thereon, and belt 37 coupled to pulley 36 and extending about tubular rim 15' of the twisting and severing assembly housing drum 14, to continuously rotate the drum 14 about a horizontal axis on the idler rollers 17 and 18. The idler rollers 23 and 24 are mounted on the main supporting frame 10 and engage the forwardly and rearwardly disposed surfaces of the tubular rims 15 and 15', respectively (relative to the hopper and reducing roller assembly 12), to position the housing drum 14 longitudinally within the supporting frame 10.

On rotation of the housing drum 14 by the electric motor 30, the epicyclic gear 68 mounted on the worm shaft 69 and journaled to the upright supporting bracket 66 carried in the housing drum 14, is carried in a circular path about the axis of rotation of the drum 14 and the axis of the stationary gear 67 on a path concentric with the circumference of the stationary gear 67. Rotation of the housing drum 14 therefore imparts a rotary drive to the epicyclic pinion 68, thereby rotating the worm 70 about its axis to drive the worm gear 71 mounted on the shaft 64 on which the drive sprocket 62 driving the chain 50, is fixed. The rotary torque driving the shaft 64 is likewise coupled to the shaft 65 driving the chain 51 through inter-engaging spur gears 72 and 73, the gear 72 being mounted on shaft 64 and the gear 73 being mounted on the shaft 65. In this manner a uniform driving torque is applied to the chain driving sprocket 62 and 63 to drive the adjacent portions of the sprocket chains 50 and 51 at the same uniform rate of speed in the direction of feed of the uncut candy strip produced by the hopper and reducing roller assembly 12.

By rotation of the threaded bolts 80 coupled through threaded apertures 79 in the ends of the sprocket shafts 77 and 78 and mounted in flanges 81, 81' at the end of the rearwardly extending sprocket tensioning arms 82, the sprocket chains 50 and 51 can be adjusted to the desired preselected tension. Likewise, by means of the bolts 83' coupled to the pivotally mounted tensioning arms 82 and extending through vertically arranged arcuate slots 84 in the rearward upright supporting bracket 85, the arms 82 may be clamped at the position along the slots 84 appropriate to the desired angular orientation of the tensioning arms to arrange the paths of movement of the sprocket chains 50 and 51 at the desired angle of convergence relative to the central axis of rotation of the housing drum 14.

As the sprocket chains 50 and 51 are driven from the epicyclic pinion 68, the opposed contact elements 45 mounted on the sprocket chains and extending perpendicularly therefrom are driven in uniform relation along the converging paths of the sprocket chains 50 and 51 so that the adjacent edges of the contact elements 45 having the gripping and severing slots 46 therein are progressively brought into mutually overlapping relationship.

The angular orientation of the sides of the slot 46 in each of the contact elements 45 is such that on initial overlapping of a pair of contact elements, a generally elliptical opening is formed, bound by the sides of the slots 46 to engage and extend around the uncut candy strip fed along the the axis of rotation of the housing drum 14. As the contact elements 45 are advanced along the converging path defined by the sprocket chains 50 and 51, the angularly disposed edges 47 of the slots are progressively overlapped with the corresponding sides of the slot in the opposing contact element 45 to securely grasp the periphery of the cylindrical candy strip. As the entire twisting and cutting assembly 11 mounted within the housing drum 14 is rotated about the central axis of rotation of the housing drum during advancing and progressive overlapping movement of the contact elements 45, a uniform rotary twist is applied to the cylindrical candy strip, transferred thereto by the gripping action of the sides 47 of the slots 46 and the contact elements 45.

At a point near the tensioning sprockets 75 and 76 near the outlet end of the housing drum 14, the convergence of the sprocket chains 50 and 51 is such that the cutting edges 48 of the slots 46 and the overlapped edges of the contact elements 45 are brought into juxtaposed shearing relation to sever the twisted cylindrical candy strip. For the remainder of the advancing movement of the sprocket chains 50 and 51 until the severed candy strip is ejected from the twisting and cutting assembly 11, the supporting elements 55 spaced between the gripping and severing contact elements 45 having the flanges 57 defining the semi-cylindrical depressions 58, receive the cut candy strip and prevent the same from being displaced out of the axis of rotation of the drum 14 constituting the feed path for the candy strip 13.

It will be apparent, therefore, that a novel and highly dependable stick candy twisting and severing mechanism has been provided, wherein a uniform, continuous helical twist is imparted to a cylindrical strip of uncut stick candy as the same is fed from the hopper and reducing roller assembly and, at the same time the helical twist is imparted thereto to generate desired stripe effect, the stick candy is progressively sheared into sticks of desired length by the gripping elements through which the helical twist is imparted to the candy strip. A consequent sizable reduction in the complexity of the mechanism and the number of moving parts involved is greatly reduced by combining these two functions in the manner taught herein.

While but one particular embodiment of the invention has been particularly shown and described, it is distinctly understood that the invention is not limited thereto, but that various modifications may be made without departing from the spirit and scope of the invention, and it is desired, therefore, that only such limitations shall be placed thereon as are imposed by the prior art and are set forth in the appended claims.

What is claimed is:

1. A machine for feeding and twisting a strip of candy and for severing said strips into predetermined lengths comprising, a series of opposed driven elements having gripping and severing means thereon, means for progressively advancing said gripping and severing means into engagement with said strip of candy to successively grip and shear said strip, and means for rotating said series of elements about the axis of said candy strip while said gripping means are in engagement therewith.

2. A machine for feeding and twisting a strip of candy and for severing said strip into predetermined lengths comprising, a series of opposed driven elements having associated gripping and cutting surfaces thereon, means for progressively advancing the gripping and severing surfaces into overlapping relation with one another to engage said strip of candy and successively grasp and shear said strip, and means for rotating said series of driven elements transversely about the axis of said candy strip while said gripping surfaces are in grasping relation therewith.

3. A machine for feeding and twisting a strip of candy and for severing said strip into predetermined lengths comprising, a series of opposed driven contact elements mounted for movement along mutually converging paths, gripping means provided on said contact elements having cutting elements disposed adjacent said gripping means operative on movement thereof along said converging paths to be brought into progressively overlapping relation about said candy strip for successively grasping the candy strip and shearing the same at the point of contact into predetermined lengths, and means for continuously rotating said series of contact elements transversely about the axis of said candy strip to impart a helical trist thereto.

4. A machine for feeding and twisting a strip of candy and for severing said strips into predetermined lengths comprising, a series of opposed driven contact elements mounted for movement along mutually converging paths, gripping surfaces provided on said contact elements having cutting surfaces disposed adjacent thereto operative on movement thereof along said converging paths to be brought into progressively overlapping relation along an axis bisecting said converging paths for grasping said candy strip and shearing the same at the point of contact into predetermined lengths, and means for continuously rotating said series of contact elements transversely about said axis.

5. A machine for feeding and twisting a strip of candy and for severing said strip into predetermined lengths comprising, a series of opposed contact elements mounted for movement along converging paths and for rotary movement about an axis coincident with the bisector of the angle of convergence of said contact elements, means for continuously rotating said opposed series of contact elements transversely about said axis, means for advancing said contact elements along said converging paths, gripping surfaces provided on said contact elements operative to receive and grasp said candy strip and impart a helical twist thereto on rotation of said series of contact elements, and cutting surfaces disposed adjacent said gripping surfaces for shearing said candy strip during convergent movement of said elements.

6. A machine for feeding and twisting a strip of candy and for severing said strip into predetermined lengths comprising, a series of opposed contact elements mounted for movement on mutually converging paths and having gripping means thereon, means for advancing said elements to progressively overlap the same into surrounding and grasping relation with said strip, means for continuously rotating said series of contact elements transversely about an axis bisecting said converging paths to impart a helical twist to said strip, and cutting surfaces disposed on said contact elements for shearing said candy strip during convergent movement of said elements.

7. A machine for feeding and twisting a strip of candy and for severing said strip into predetermined lengths comprising a series of opposed contact elements having means for driving said elements along mutually converging paths to progressively overlap gripping means thereon for grasping said strip, means for continuously rotating said series of contact elements transversely about the bisector of said converging paths to impart a helical twist to said strip, and fixed cutting elements provided on said contact elements adapted to be brought into shearing relationship during convergent movement of said opposed series of gripping means to sever said candy strip.

8. A machine for feeding and twisting a strip of candy and for severing said strip into predetermined lengths comprising a series of opposed gripping elements spaced longitudinally and driven along mutually converging paths adjacent a feed path for said stick candy to grip said strip along opposed surfaces thereof, means for continuously rotating said opposed gripping elements about said feed path to impart a helical twist to said strip, and fixed cutting surfaces provided on said opposed gripping means adapted to be brought into shearing relationship during convergent movement of said opposed series of gripping means to sever said candy strip.

9. A machine for feeding and twisting a strip of candy and for severing said strip into predetermined lengths comprising, a feeding assembly having a series of opposed driven contact elements mounted on endless belt means disposed for movement along mutually converging paths, said contact elements being provided with gripping surfaces thereon having cutting surfaces extending therebetween each operative on movement thereof along said converging paths to be advanced into progressively overlapping relation along an axis bisecting said converging paths for successively grasping said candy strip and shearing the same at the point of contact into predetermined lengths, and means for continuously rotating said assembly transversely about said axis to impart a helical twist to said candy strip.

10. A machine for feeding and twisting a strip of candy and for severing said strip into predetermined lengths comprising, drum means mounted for rotation about a horizontal axis, and feeding assembly mounted within said drum and including a series of opposed driven contact elements mounted on endless belt means disposed for movement along mutually converging paths, said contact elements being provided with opposed gripping surfaces thereon having cutting surfaces extending therebetween each operative on movement thereof along said converging paths to be advanced into progressively overlapping relation along an axis bisecting said converging paths for successively grasping said candy strip and shearing the same at the point of contact into predetermined lengths, and means for continuously rotating said drum transversely about said bisecting axis to impart a helical twist to said candy strip through said gripping means.

11. A machine for feeding and twisting a strip of candy and for severing said strip into predetermined lengths comprising, a cylindrical housing drum mounted for rotation about a horizontal axis, a feeding assembly disposed within said drum and rotatable therewith comprising a series of opposed blade members mounted on endless conveyor means disposed for movement along mutually convergent paths, means for driving said endless conveyor means, said blade elements being provided with slots on adjacent edges of opposed pairs of said blade elements, said slots being provided with gripping surfaces thereon having cutting surfaces extending therebetween each operative on movement of said elements along said converging paths to be advanced into progressively overlapping relation along an axis bisecting said converging paths for successively grasping said candy strip and shearing the same at the point of contact into predetermined lengths, and means for continuously rotating said housing drum transversely about its horizontal axis of rotation coincident with the axis bisecting said converging paths to impart a helical twist to said candy strip through said blade elements.

GREGORY HARDING KELLER.

REFERENCES CITED

The following references are of record in the file of this patent:

UNITED STATES PATENTS

| Number | Name | Date |
|---|---|---|
| 559,323 | Drake | Apr. 28, 1896 |
| 1,242,562 | Laskey | Oct. 9, 1917 |
| 1,400,127 | Zaiss | Dec. 13, 1921 |
| 2,278,574 | Spohr et al. | Apr. 7, 1942 |